(12) United States Patent
Ding et al.

(10) Patent No.: US 11,447,161 B2
(45) Date of Patent: Sep. 20, 2022

(54) ENERGY-ABSORBING ANTI-CREEPER AND TRAIN VEHICLE WITH ENERGY-ABSORBING ANTI-CREEPER

(71) Applicant: CRRC QINGDAO SIFANG CO., LTD, Shandong (CN)

(72) Inventors: Sansan Ding, Shandong (CN); Yonggui Zhang, Shandong (CN); Aiqin Tian, Shandong (CN); Honglei Tian, Shandong (CN); Shizhong Zhao, Shandong (CN); Luxing Li, Shandong (CN)

(73) Assignee: CRRC QINGDAO SIFANG CO., LTD, Shandong (CN)

( * ) Notice: Subject to any disclaimer, the term of this patent is extended or adjusted under 35 U.S.C. 154(b) by 335 days.

(21) Appl. No.: 16/624,044

(22) PCT Filed: Apr. 20, 2018

(86) PCT No.: PCT/CN2018/083852
§ 371 (c)(1),
(2) Date: Dec. 18, 2019

(87) PCT Pub. No.: WO2019/011029
PCT Pub. Date: Jan. 17, 2019

(65) Prior Publication Data
US 2020/0130715 A1 Apr. 30, 2020

(30) Foreign Application Priority Data
Jul. 11, 2017 (CN) .................. 201710556167.X

(51) Int. Cl.
*B61F 19/04* (2006.01)
*B61D 15/06* (2006.01)
(Continued)

(52) U.S. Cl.
CPC .............. *B61F 19/04* (2013.01); *B61D 15/06* (2013.01); *B60R 19/34* (2013.01);
(Continued)

(58) Field of Classification Search
CPC ......... B61F 19/04; B61D 15/06; B61D 17/06; B61G 11/16; B60R 19/34; B60R 2019/026; B60Y 2200/30; F16F 7/12
See application file for complete search history.

(56) References Cited

U.S. PATENT DOCUMENTS

| 2,997,325 A | 8/1961 | Peterson |
| 2016/0347333 A1 | 12/2016 | Lenzi |
| 2019/0092355 A1 | 3/2019 | Gao |

FOREIGN PATENT DOCUMENTS

| CN | 2716087 Y | 8/2005 |
| CN | 102398558 A | 4/2012 |

(Continued)

OTHER PUBLICATIONS

International Search Report for corresponding application PCT/CN2018/083852 filed Apr. 20, 2018; dated Jul. 27, 2018.
European Search Report for corresponding application EP18 83 2693; Report dated Nov. 16, 2020.
Singapore Office Action for corresponding application 11201912522Y; Report dated Aug. 24, 2020.

*Primary Examiner* — Robert J McCarry, Jr.
(74) *Attorney, Agent, or Firm* — Cantor Colburn LLP

(57) ABSTRACT

Some embodiments of the present disclosure provide an energy-absorbing anti-creeper and a train vehicle with the energy-absorbing anti-creeper. The energy-absorbing anti-creeper includes: a guiding cylinder, an energy-absorbing material, a collision mechanism and a discharging mechanism for discharging the energy-absorbing material being arranged at the first end of the guiding cylinder. A first end of the guiding cylinder is configured to be in assembly connection with a train. The energy-absorbing material is filled in the guiding cylinder. The collision mechanism is
(Continued)

arranged at a second end of the guiding cylinder. The first end of the guiding cylinder and the second end of the guiding cylinder are two opposite ends of the guiding cylinder.

18 Claims, 3 Drawing Sheets

(51) Int. Cl.
    *B60R 19/34* (2006.01)
    *B60R 19/02* (2006.01)
    *B61D 17/06* (2006.01)
    *B61G 11/16* (2006.01)
    *F16F 7/12* (2006.01)

(52) U.S. Cl.
    CPC ..... *B60R 2019/026* (2013.01); *B60Y 2200/30* (2013.01); *B61D 17/06* (2013.01); *B61G 11/16* (2013.01); *F16F 7/12* (2013.01)

(56) References Cited

FOREIGN PATENT DOCUMENTS

| | | | |
|---|---|---|---|
| CN | 103287449 A | 9/2013 | |
| CN | 103818402 A * | 5/2014 | ............. B61F 19/04 |
| CN | 103818402 A | 5/2014 | |
| CN | 104494629 A | 4/2015 | |
| CN | 204713095 U | 10/2015 | |
| CN | 204895482 U | 12/2015 | |
| CN | 105438212 A | 3/2016 | |
| CN | 105644579 A | 6/2016 | |
| CN | 105905056 A | 8/2016 | |
| CN | 205997888 U | 3/2017 | |
| CN | 107512281 A | 12/2017 | |
| JP | 2007210441 A | 8/2007 | |
| KR | 20090059464 A | 12/2007 | |
| KR | 101125769 B1 | 4/2012 | |
| WO | 2009072843 A2 | 6/2009 | |

* cited by examiner

ENERGY-ABSORBING ANTI-CREEPER AND TRAIN VEHICLE WITH ENERGY-ABSORBING ANTI-CREEPER

TECHNICAL FIELD

The present disclosure relates to a field of train protection equipment, and more particularly to an energy-absorbing anti-creeper and a train vehicle with the energy-absorbing anti-creeper.

BACKGROUND

With a development of a rail transit industry, a passive safety of rail vehicles has been paid more and more attention, and train anti-creeping devices are gradually applied to the rail vehicles. In a limited space at a front end of a train, an anti-creeper with large absorbing energy and high efficiency is very beneficial to improve a passive safety of rail vehicle collision.

In a process of train collision, the related energy-absorbing anti-creeper only absorbs collision energy by the compression deformation of an energy-absorbing material, and the internal energy-absorbing material cannot be discharged from a closed space, so that the energy-absorbing material cannot be further compressed when being compressed to a certain extent, resulting in lower energy-absorbing efficiency and lower use safety.

SUMMARY

Some embodiments of the present disclosure provide an energy-absorbing anti-creeper and a train vehicle with the energy-absorbing anti-creeper, intended to solve the problem in the related technology of low energy-absorbing efficiency of an energy-absorbing anti-creeper.

Some embodiments of the present disclosure provide an energy-absorbing anti-creeper, which includes: a guiding cylinder, a first end of the guiding cylinder being configured to be in assembly connection with a train; an energy-absorbing material, filled in the guiding cylinder; a collision mechanism, arranged at a second end of the guiding cylinder; and a discharging mechanism for discharging the energy-absorbing material being arranged at the first end of the guiding cylinder; wherein the first end of the guiding cylinder and the second end of the guiding cylinder are two opposite ends of the guiding cylinder, and the energy-absorbing material is extruded to deform when a collision occurs between the collision mechanism and a collision object and then is discharged by the discharging mechanism so as to buffer an collision energy of the collision object.

In an exemplary embodiment, the discharging mechanism includes: a guiding cone, covering an opening of the first end of the guiding cylinder. A gap is provided between the guiding cone and a cylinder edge of the first end of the guiding cylinder, the gap forming a passage for discharging the energy-absorbing material.

In an exemplary embodiment, the guiding cylinder is of cylindrical, and an end face of the guiding cone is provided with a flange portion coupled to the guiding cylinder.

In an exemplary embodiment, the energy-absorbing anti-creeper includes: a connecting flange, coupled to the guiding cone and disposed on the first end of the guiding cylinder; and a guiding ring, coupled to the connecting flange, wherein the guiding ring extends along a circumferential direction of the guiding cylinder, and a passage for discharging the energy-absorbing material is formed between the guiding ring and an inner wall surface of the guiding cone.

In an exemplary embodiment, the guiding ring is of annular, and the discharging mechanism further includes: a plurality of rear cutters, the plurality of rear cutters being spaced apart on the guiding ring along a circumferential direction of the guiding ring. An extrusion groove is formed between two adjacent rear cutters in the plurality of rear cutters, and the energy-absorbing material is cut into a plurality of pieces by each of the plurality of rear cutters in a process of being extruded by the collision mechanism and discharged from a gap between the extrusion groove and the inner wall surface of the guiding cone.

In an exemplary embodiment, the collision mechanism includes: a pressing plate, arranged inside a cylinder body of the second end of the guiding cylinder and abutted against the energy-absorbing material, the pressing plate is configured to extrude the energy-absorbing material when colliding with the collision object.

In an exemplary embodiment, the pressing plate is coupled to an inner wall of the guiding cylinder by a shear pin.

In an exemplary embodiment, the energy-absorbing anti-creeper includes an annular flange abutting against the inner wall of the guiding cylinder, wherein the annular flange is arranged along a circumferential direction of the pressing plate, and the annular flange extends along an axial direction of the guiding cylinder.

In an exemplary embodiment, the collision mechanism further includes: a collision plate, arranged at the second end of the guiding cylinder. An end face, facing the guiding cylinder, of the collision plate, is coupled to the pressing plate, and an end face, facing away from the guiding cylinder, of the collision plate is provided with anti-creeping teeth for contacting the collision object.

In an exemplary embodiment, the collision mechanism further includes: a plurality of front cutters, arranged on the end face of the collision plate facing the guiding cylinder. The plurality of front cutters are spaced apart along a circumferential direction of an inner wall of the guiding cylinder to cut the guiding cylinder along a movement direction of the collision plate when the collision mechanism is collided by the collision object.

In an exemplary embodiment, the collision mechanism further includes: a guiding groove, provided on the end face of the collision plate facing the guiding cylinder. The guiding groove surrounds a circumferential direction of the guiding cylinder such that an end wall of the guiding cylinder is curled along the guiding groove when being cut and extruded.

In an exemplary embodiment, a position of the guiding cylinder corresponding to each of the plurality of front cutters is provided with a preset defect groove, the preset defect groove extending along the axial direction of the guiding cylinder.

Some embodiments of the present disclosure provide a train vehicle, which includes an energy-absorbing anti-creeper. The energy-absorbing anti-creeper is the energy-absorbing anti-creeper as mentioned above.

In an exemplary embodiment, there are a plurality of energy-absorbing anti-creepers, the plurality of energy-absorbing anti-creepers are arranged at front and rear ends of the train vehicle respectively.

The energy-absorbing anti-creeper applying the technical solution of the present disclosure includes: a guiding cylinder, an energy-absorbing material and a collision mechanism. A first end of the guiding cylinder is configured to be in assembly connection with a train. The energy-absorbing material is filled in the guiding cylinder. The collision mechanism is arranged at a second end of the guiding cylinder. The first end of the guiding cylinder and the second end of the guiding cylinder are two opposite ends of the guiding cylinder. A discharging mechanism for discharging the energy-absorbing material is arranged at the first end of the guiding cylinder. The energy-absorbing material is extruded to deform when a collision occurs between the collision mechanism and a collision object and is discharged by the discharging mechanism so as to buffer the collision energy of the collision object. Thus, the energy-absorbing material in the energy-absorbing anti-creeper can be discharged from the discharging mechanism in a process of being extruded when a train is collided, thereby effectively increasing energy-absorbing efficiency, and solving the problem in the related technology of low energy-absorbing efficiency of an energy-absorbing anti-creeper.

BRIEF DESCRIPTION OF THE DRAWINGS

The accompanying drawings, which constitute a part of this application, are used to provide a further understanding of the present disclosure, and the exemplary embodiments of the present disclosure and the description thereof are used to explain the present disclosure, but do not constitute improper limitations to the present disclosure. In the drawings.

The drawings include the following reference signs:
10, guiding cylinder; 20, energy-absorbing material; 30, collision mechanism; 31, pressing plate; 32, shear pin; 33, annular flange; 34, collision plate; 35, front cutter; 36, guiding groove; 37, preset defect groove; 38, anti-creeping tooth; 40, discharging mechanism; 41, guiding cone; 42, guiding ring; 43, rear cutter; and 44, extrusion groove.

DETAILED DESCRIPTION OF THE EMBODIMENTS

It is to be noted that in the case of no conflict, the features in the embodiments and the embodiments in the present application may be combined with each other. The present disclosure is described below with reference to the drawings and in conjunction with the embodiments in detail.

Figure 1:
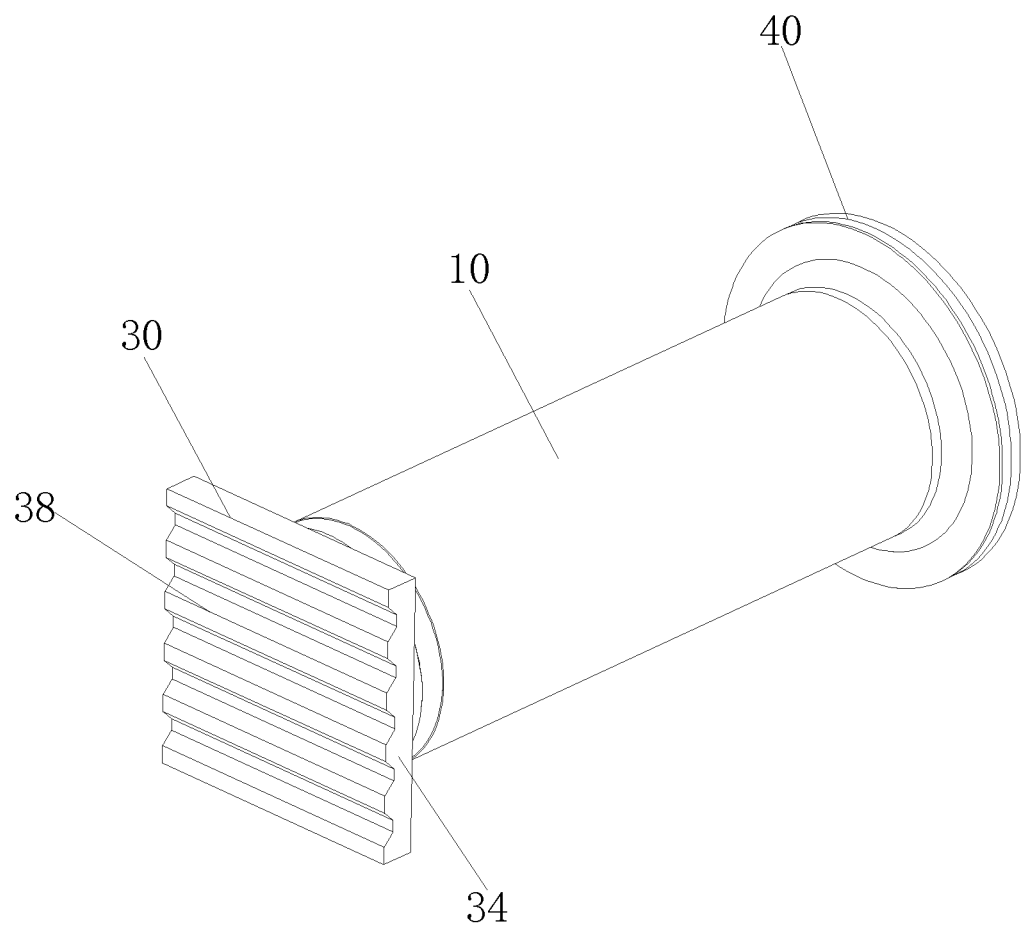
FIG. 1 illustrates a three-dimensional structure diagram of an optional energy-absorbing anti-creeper according to an embodiment of the present disclosure.
Figure 2:
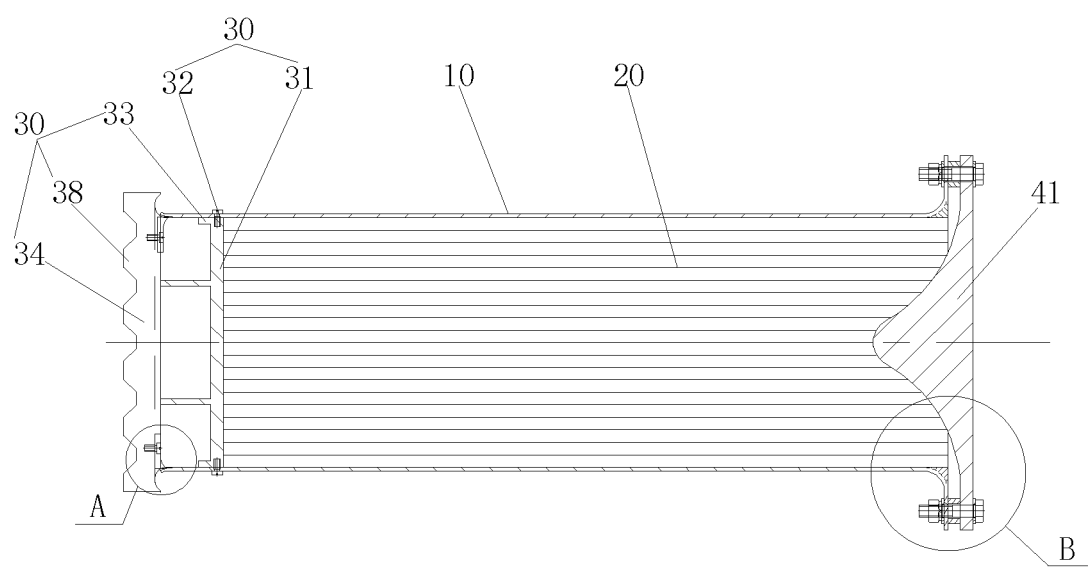
FIG. 2 illustrates a structure longitudinal-section diagram of an optional energy-absorbing anti-creeper according to an embodiment of the present disclosure.

As shown in FIG. 1 and FIG. 2, an energy-absorbing anti-creeper according to an embodiment of the present disclosure includes: a guiding cylinder 10, an energy-absorbing material 20; a collision mechanism 30; and a discharging mechanism 40 for discharging the energy-absorbing material 20 being arranged at the first end of the guiding cylinder 10. A first end of the guiding cylinder 10 is configured to be in assembly connection with a train. The energy-absorbing material 20 is filled in the guiding cylinder 10. The collision mechanism 30 is arranged at a second end of the guiding cylinder 10. The first end of the guiding cylinder 10 and the second end of the guiding cylinder 10 are two opposite ends of the guiding cylinder 10. The energy-absorbing material 20 is extruded to deform when a collision occurs between the collision mechanism 30 and a collision object and then is discharged by the discharging mechanism 40 so as to buffer an collision energy of the collision object.

An energy-absorbing anti-creeper applying the technical solution of the present disclosure includes a guiding cylinder 10, an energy-absorbing material 20 and a collision mechanism 30. A first end of the guiding cylinder 10 is configured to be in assembly connection with a train. The energy-absorbing material 20 is filled in the guiding cylinder 10. The collision mechanism 30 is arranged at a second end of the guiding cylinder 10. The first end of the guiding cylinder 10 and the second end of the guiding cylinder 10 are two opposite ends of the guiding cylinder 10. A discharging mechanism 40 for discharging the energy-absorbing material 20 is arranged at the first end of the guiding cylinder 10. The energy-absorbing material 20 is extruded to deform when a collision occurs between the collision mechanism 30 and a collision object and then is discharged by the discharging mechanism 40 so as to buffer the collision energy of the collision object. Thus, the energy-absorbing material 20 in the energy-absorbing anti-creeper can be discharged from the discharging mechanism 40 in the process of being extruded when a train is collided, thereby effectively increasing energy-absorbing efficiency, and solving the problem in the related technology of low energy-absorbing efficiency of an energy-absorbing anti-creeper.

Figure 3:
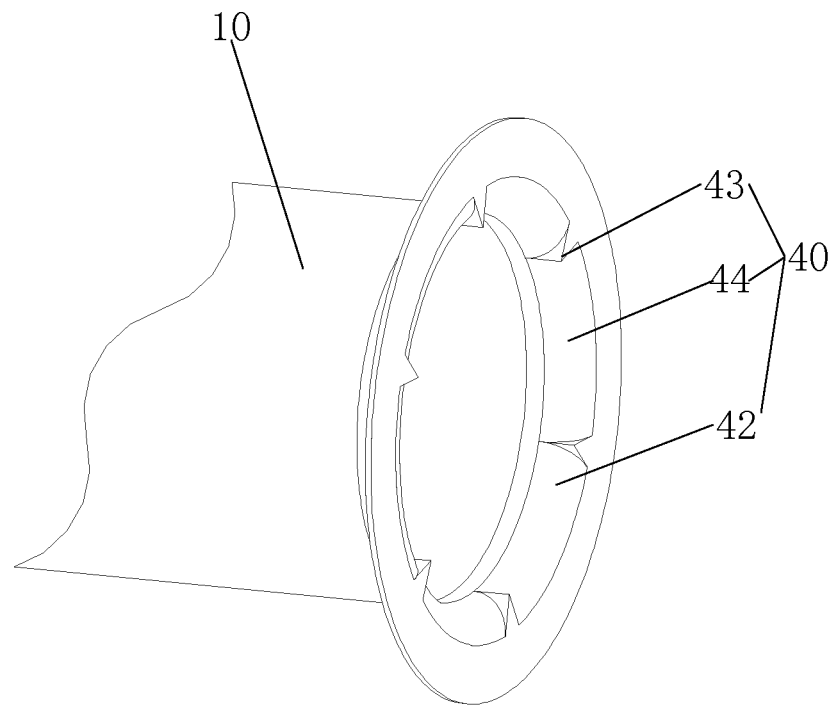
FIG. 3 illustrates a structure diagram of a discharging mechanism of an optional energy-absorbing anti-creeper according to an embodiment of the present disclosure.
Figure 4:
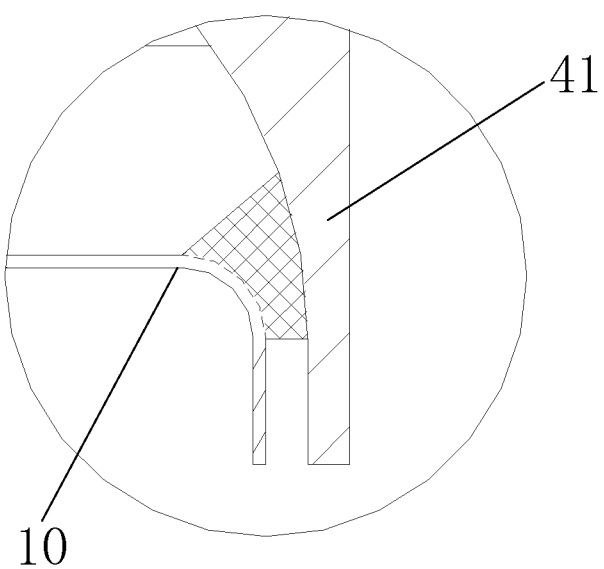
FIG. 4 illustrates an enlarged structure diagram of a part B of the energy-absorbing anti-creeper in FIG. 2.

In an exemplary embodiment, the first end of the guiding cylinder 10 is provided with a mounting seat connected to the train, and the energy-absorbing anti-creeper is in assembly connection with the train by the mounting seat. The energy-absorbing material 20 is a material such as honeycomb aluminum, foamed aluminum, or glass fiber reinforced plastic. As shown in FIG. 2 to FIG. 4, the guiding cylinder 10 is cylindrical. The discharging mechanism 40 includes: a guiding cone 41. The guiding cone 41 covers an opening of the first end of the guiding cylinder 10. An end face of the guiding cone 41 is provided with a flange portion coupled to the guiding cylinder 10. Correspondingly, the energy-absorbing anti-creeper includes: a connecting flange, coupled to the guiding cone 41 and disposed on the first end of the guiding cylinder 10; and a guiding ring 42, coupled to the connecting flange. The flange portion on the guiding cone 41 is coupled to the connecting flange on the guiding cylinder 10 by a bolt. The guiding ring 42 is annular and adapted to a diameter of the guiding cylinder 10. The guiding ring 42 extends along a circumferential direction of the guiding cylinder 10. A central portion of an inner end face of the guiding cone 41 convexly extends toward the inside of the guiding cylinder 10. After the guiding cone 41 is mounted on the guiding cylinder 10, the passage for discharging the energy-absorbing material 20 is formed between the guiding ring 42 and an inner wall surface of the guiding cone 41. The energy-absorbing material 20 in the guiding cylinder 10 is extruded through the gap between the guiding ring 42 and the inner wall surface of the guiding cone 41 when being extruded to achieve the effect of enhancing the buffer force.

Since the gap between the guiding ring 42 and the guiding cone 41 is narrower, the energy-absorbing material 20 is rapidly extruded in the event of a collision, which easily causes a dead zone of the energy-absorbing material 20, that is, the energy-absorbing material 20 cannot be further compressed after being compressed to a certain extent. Therefore, in order to enable the energy-absorbing material 20 to be smoothly discharged from the gap between the guiding ring 42 and the guiding cone 41 and to avoid a working dead zone of the energy-absorbing material 20, further, as shown in FIG. 3, the discharging mechanism 40 also includes: a plurality of rear cutters 43, the plurality of rear cutters 43 being spaced apart on the guiding ring 42 along a circumferential direction of the guiding ring 42. An extrusion groove 44 is formed between two adjacent rear cutters 43 in the plurality of rear cutters 43, and the energy-absorbing material 20 is cut into a plurality of pieces by each of the plurality of rear cutters 43 in a process of being extruded by the collision mechanism 30 and discharged from a gap between the corresponding extrusion groove 44 and the inner wall surface of the guiding cone 41. Through the plurality of rear cutters 43, the energy-absorbing material 20 of which the density is rapidly increased after being extruded can be cut into a plurality of small pieces, thereby facilitating the discharge of the energy-absorbing material 20, reducing the range of the energy-absorbing dead zone of the energy-absorbing material 20, and improving the buffer energy-absorbing capacity.

As shown in FIG. 2, the collision mechanism 30 includes a pressing plate 31 and a collision plate 34. Both the pressing plate 31 and the collision plate 34 are arranged at the second end of the guiding cylinder 10. The pressing plate 31 is arranged inside a cylinder body and abutted against one end of the energy-absorbing material 20 for extruding the energy-absorbing material 20 when colliding with the collision object. The pressing plate 31 is coupled to an inner wall of the guiding cylinder 10 by a shear pin 32. An end face, facing the guiding cylinder 10, of the collision plate 34, is connected to the pressing plate 31, and an end face, facing away from the guiding cylinder 10, of the collision plate 34, is provided with anti-creeping teeth 38 for contacting the collision object. In an exemplary embodiment, an annular connecting portion is arranged between the collision plate 34 and the pressing plate 31. The collision plate 34 is connected to the pressing plate 31 by the annular connection portion and integrated into one body. There are a plurality of anti-creeping teeth 38 on the collision plate 34. The plurality of anti-creeping teeth 38 are spaced apart on a collision surface of the collision plate 34 along a transverse direction of the collision plate 34.

Figure 5:
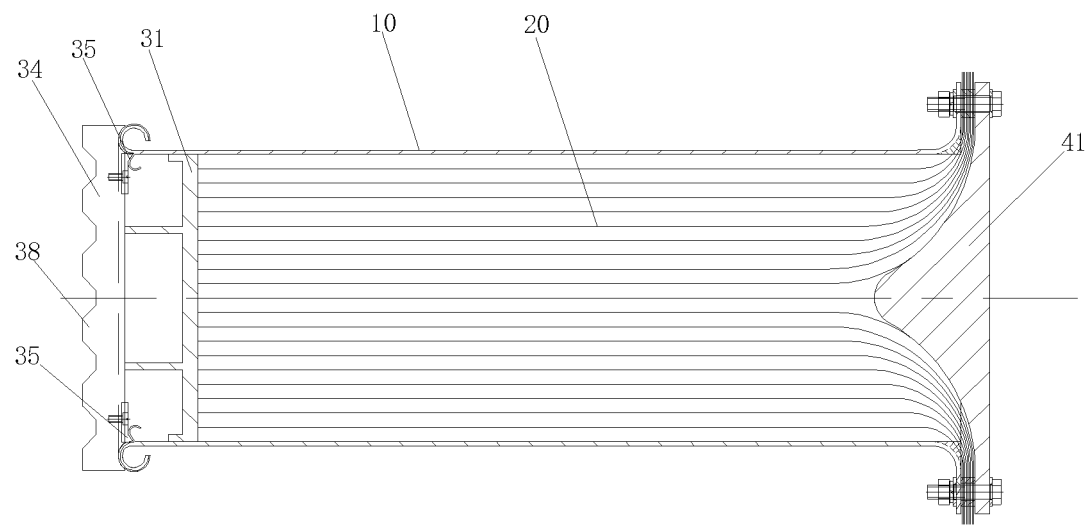
FIG. 5 illustrates a deformation structure diagram of a guiding cylinder and an energy-absorbing material of an optional energy-absorbing anti-creeper in a collision process according to an embodiment of the present disclosure.

When the train collides with the collision object, as shown in FIG. 5, the anti-creeping teeth 38 directly collide with the collision object. Under an action of a large impact force, the energy-absorbing material 20 in the inside of the guiding cylinder 10 is extruded by the collision plate 34 and the pressing plate 31. Under the pushing action of the collision plate 34, when an interface force reaches a value, the shear pin 32 for connecting the pressing plate 31 is sheared so that the pressing plate 31 applies an impact force to the energy-absorbing material 20. At the same time of compressing the energy-absorbing material 20, the energy-absorbing material 20 near one end of the discharging mechanism 40 is extruded through the gap between the guiding ring 42 and the inner wall surface of the guiding cone 41. Thus, by the deformation of the energy-absorbing material 20 and the extrusion discharge of the energy-absorbing material 20, the impact force of the collision is buffered and energy-absorbed. The guiding cone 41 guides the energy-absorbing material 20 in the process of discharging the energy-absorbing material 20 through the gap between the guiding ring 42 and the inner wall surface of the guiding cone 41. The energy-absorbing material is guided to the rear cutters 43 and the extrusion groove 44.

In order to keep the movement of the pressing plate 31 stable during the pressing process of the energy-absorbing material 20 by the pressing plate 31, further, as shown in FIG. 2, the energy-absorbing anti-creeper includes an annular flange 33 abutting against the inner wall of the guiding cylinder 10, wherein the annular flange 33 is arranged along a circumferential direction of the pressing plate 31. The annular flange 33 extends for a certain length along an axial direction of the guiding cylinder 10. The pressing plate 31 has a thickness by providing the annular flange 33 on the pressing plate 31, thereby increasing the contact area of the pressing plate 31 with the inner wall of the guiding cylinder 10 to ensure that the pressing plate 31 can stably extrude the energy-absorbing material 20 under the action of a large impact force. During the collision, a contact portion of the pressing plate 31 and the guiding cylinder 10 is not deformed, and achieves the function of vertical anti-creeping together with the anti-creeping teeth 38.

Figure 6:
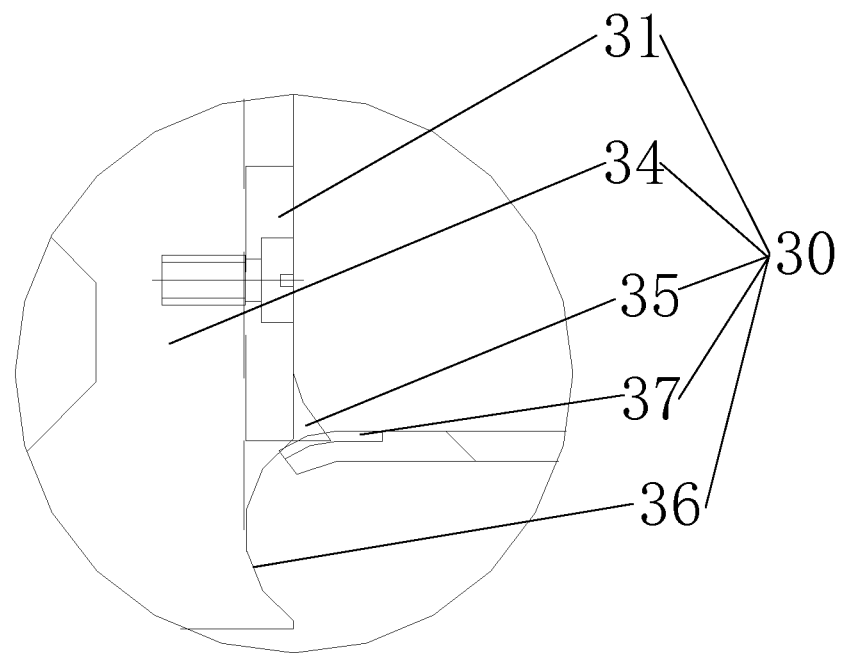
FIG. 6 illustrates an enlarged structure diagram of a part A of the energy-absorbing anti-creeper in FIG. 2.

In order to further enhance the buffer force, as shown in FIG. 2 and FIG. 6, the collision mechanism 30 further includes: a plurality of front cutters 35. The plurality of front cutters 35 are arranged on the end face of the collision plate 34 facing the guiding cylinder 10. The plurality of front cutters 35 are spaced apart along a circumferential direction of an inner wall of the guiding cylinder 10. As shown in FIG. 5, when the collision mechanism 30 is collided by the collision object, the plurality of front cutters 35 cut a part of the inner wall of the guiding cylinder 10 along a movement direction of the collision plate 34. A portion of the cut part is curled toward the inside of the guiding cylinder 10, and the remaining portion of the cut part is curled toward the outside of the guiding cylinder 10 under the action of a rear end wall of the collision plate 34, thereby increasing the pushing resistance. By cutting, the effective energy-absorbing stroke of the entire energy-absorbing anti-creeper is increased, thereby improving the buffer energy-absorbing effect.

In order to facilitate better bending and curling of the cylinder wall of the guiding cylinder 10 which is curled toward the outside of the guiding cylinder 10 after being cut by the front cutters 35 so as to further enhance the energy-absorbing effect, In an exemplary embodiment, as shown in FIG. 2 and FIG. 6, the collision mechanism 30 further includes a guiding groove 36. The guiding groove 36 is provided on the end face of the collision plate 34 facing the guiding cylinder 10. The guiding groove 36 surrounds a circumferential direction of the guiding cylinder 10. Each of the front cutters 35 is adjacent to the inner edge of the guiding groove 36. The groove wall of the guiding groove 36 is an arc surface. The bent part of the end wall of the guiding cylinder 10 curled toward the outside of the guiding cylinder 10 when being cut and extruded is curled by the arc surface of the guiding groove 36, thereby further improving the energy-absorbing effect.

In order to make blades of the front cutters 35 smoothly cut the cylinder wall of the guiding cylinder 10 at a beginning of the collision, In an exemplary embodiment, a position of the guiding cylinder 10 corresponding to each of the front cutters 35 is provided with a preset defect groove 37, the preset defect groove 37 extending along the axial direction of the guiding cylinder 10. At a moment when the collision is started, the blades of the front cutters start cutting the cylinder wall of the guiding cylinder 10 from the preset defect groove 37 to prevent a hard collision between the cutters and the cylinder wall of the guiding cylinder 10.

According to another embodiment of the present disclosure, a train vehicle is provided, which includes an energy-absorbing anti-creeper. The energy-absorbing anti-creeper is the energy-absorbing anti-creeper in the above embodiment. A rear end of the energy-absorbing anti-creeper is provided with a mounting seat. The mounting seat is provided with a mounting port connected to the train vehicle. The energy-absorbing anti-creeper is in assembly connection with the train by the mounting seat. In an exemplary embodiment, a guiding cone 41 at a rear end of the energy-absorbing anti-creeper is integrated on the mounting seat. According to the train vehicle applying the energy-absorbing anti-creeper of the above embodiment, the energy-absorbing material 20 in the energy-absorbing anti-creeper can be discharged from the discharging mechanism 40 in the process of being extruded when a train is collided, thereby effectively increasing energy-absorbing efficiency, and solving the problem in the related technology of low energy-absorbing efficiency of an energy-absorbing anti-creeper.

In a specific implementation, there are a plurality of energy-absorbing anti-creepers on each train. The plurality of energy-absorbing anti-creepers are arranged at front and rear ends of the train vehicle respectively. When two trains collide, the energy-absorbing anti-creeper at a front end of one train collides with the energy-absorbing anti-creeper at a rear end of the other train and buffers the impact force. During the collision, anti-creeping teeth 38 at front ends of the two energy-absorbing anti-creepers are in contact with each other and are extruded. A good vertical anti-creeping function is always kept. Collision by the anti-creeping teeth 38 can effectively prevent the train from derailing.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the spirit and principle of the present disclosure shall fall within the scope of protection of the present disclosure.

What is claimed is:
1. An energy-absorbing anti-creeper, comprising:
 a guiding cylinder, a first end of the guiding cylinder being configured to be in assembly connection with a train;
 an energy-absorbing material, filled in the guiding cylinder;
 a collision mechanism, arranged at a second end of the guiding cylinder; and
 a discharging mechanism for discharging the energy-absorbing material being arranged at the first end of the guiding cylinder;
 wherein the first end of the guiding cylinder and the second end of the guiding cylinder are two opposite ends of the guiding cylinder, and the energy-absorbing material is extruded to deform when a collision occurs between the collision mechanism and a collision object and then is discharged by the discharging mechanism so as to buffer an collision energy of the collision object,
 the collision mechanism comprises:
 a pressing plate, arranged inside a cylinder body of the second end of the guiding cylinder and abutted against the energy-absorbing material, wherein the pressing plate is configured to extrude the energy-absorbing material when colliding with the collision object, the pressing plate is coupled to an inner wall of the guiding cylinder by a shear pin.

2. The energy-absorbing anti-creeper according to claim 1, wherein the discharging mechanism comprises:
 a guiding cone, covering an opening of the first end of the guiding cylinder,
 wherein a gap is provided between the guiding cone and a cylinder edge of the first end of the guiding cylinder, the gap forming a passage for discharging the energy-absorbing material.

3. The energy-absorbing anti-creeper according to claim 2, wherein the guiding cylinder is of cylindrical, and an end face of the guiding cone is provided with a flange portion coupled to the guiding cylinder.

4. The energy-absorbing anti-creeper according to claim 2, wherein the energy-absorbing anti-creeper comprises:
 a connecting flange, coupled to the guiding cone and disposed on the first end of the guiding cylinder; and
 a guiding ring, coupled to the connecting flange wherein the guiding ring extends along a circumferential direction of the guiding cylinder, and the passage for discharging the energy-absorbing material is formed between the guiding ring and an inner wall surface of the guiding cone.

5. The energy-absorbing anti-creeper according to claim 4, wherein the guiding ring is of annular, and the discharging mechanism further comprises:
 a plurality of rear cutters, the plurality of rear cutters being spaced apart on the guiding ring along a circumferential direction of the guiding ring,
 wherein an extrusion groove is formed between two adjacent rear cutters in the plurality of rear cutters, and the energy-absorbing material is cut into a plurality of pieces by each of the plurality of rear cutters in a process of being extruded by the collision mechanism and discharged from a gap between the extrusion groove and the inner wall surface of the guiding cone.

6. The energy-absorbing anti-creeper according to claim 1, wherein the energy-absorbing anti-creeper comprises an annular flange abutting against the inner wall of the guiding cylinder, wherein the annular flange is arranged along a circumferential direction of the pressing plate, and the annular flange extends along an axial direction of the guiding cylinder.

7. The energy-absorbing anti-creeper according to claim 1, wherein the collision mechanism further comprises:
 a collision plate, arranged at the second end of the guiding cylinder, an end face, facing the guiding cylinder, of the collision plate, is coupled to the pressing plate, and an end face, facing away from the guiding cylinder, of the collision plate, is provided with anti-creeping teeth for contacting the collision object.

8. The energy-absorbing anti-creeper according to claim 7, wherein the collision mechanism further comprises:
 a plurality of front cutters, arranged on the end face of the collision plate facing the guiding cylinder, the plurality of front cutters being spaced apart along a circumferential direction of an inner wall of the guiding cylinder to cut the guiding cylinder along a movement direction of the collision plate when the collision mechanism is collided by the collision object.

9. The energy-absorbing anti-creeper according to claim 8, wherein the collision mechanism further comprises:
 a guiding groove, provided on the end face of the collision plate facing the guiding cylinder, the guiding groove surrounding a circumferential direction of the guiding cylinder such that an end wall of the guiding cylinder is curled along the guiding groove when being cut and extruded.

10. The energy-absorbing anti-creeper according to claim 8, wherein a position of the guiding cylinder corresponding to each of the plurality of front cutters is provided with a preset defect groove, the preset defect groove extending along the axial direction of the guiding cylinder.

11. A train vehicle, comprising an energy-absorbing anti-creeper, wherein the energy-absorbing anti-creeper is the energy-absorbing anti-creeper according to claim 1.

12. The train vehicle as claimed in claim 11, wherein the discharging mechanism comprises:
   a guiding cone, covering an opening of the first end of the guiding cylinder,
   wherein a gap is provided between the guiding cone and a cylinder edge of the first end of the guiding cylinder, the gap forming a passage for discharging the energy-absorbing material.

13. The train vehicle as claimed in claim 12, wherein the guiding cylinder is of cylindrical, and an end face of the guiding cone is provided with a flange portion coupled to the guiding cylinder.

14. The train vehicle as claimed in claim 12, wherein the energy-absorbing anti-creeper comprises:
   a connecting flange, coupled to the guiding cone and disposed on the first end of the guiding cylinder; and
   a guiding ring, coupled to the connecting flange wherein the guiding ring extends along a circumferential direction of the guiding cylinder, and the passage for discharging the energy-absorbing material is formed between the guiding ring and an inner wall surface of the guiding cone.

15. The train vehicle as claimed in claim 14, wherein the guiding ring is of annular, and the discharging mechanism further comprises:
   a plurality of rear cutters, the plurality of rear cutters being spaced apart on the guiding ring along a circumferential direction of the guiding ring,
   wherein an extrusion groove is formed between two adjacent rear cutters in the plurality of rear cutters, and the energy-absorbing material is cut into a plurality of pieces by each of the plurality of rear cutters in a process of being extruded by the collision mechanism and discharged from a gap between the extrusion groove and the inner wall surface of the guiding cone.

16. The train vehicle as claimed in claim 11, wherein the collision mechanism comprises:
   a pressing plate, arranged inside a cylinder body of the second end of the guiding cylinder and abutted against the energy-absorbing material, wherein the pressing plate is configured to extrude the energy-absorbing material when colliding with the collision object.

17. The train vehicle as claimed in claim 16, wherein the pressing plate is coupled to an inner wall of the guiding cylinder by a shear pin.

18. The train vehicle as claimed in claim 11, wherein there are a plurality of energy-absorbing anti-creepers, the plurality of energy-absorbing anti-creepers are arranged at front and rear ends of the train vehicle respectively.

\* \* \* \* \*